(12) United States Patent
Ikeda

(10) Patent No.: US 8,630,028 B2
(45) Date of Patent: Jan. 14, 2014

(54) IMAGE READING APPARATUS

(75) Inventor: Minoru Ikeda, Ishikawa (JP)

(73) Assignee: PFU Limited, Ishikawa (JP)

( * ) Notice: Subject to any disclaimer, the term of this patent is extended or adjusted under 35 U.S.C. 154(b) by 388 days.

(21) Appl. No.: 12/825,437

(22) Filed: Jun. 29, 2010

(65) Prior Publication Data
US 2011/0181925 A1 Jul. 28, 2011

(30) Foreign Application Priority Data

Jan. 25, 2010 (JP) ................. 2010-013619

(51) Int. Cl.
*H04N 1/40* (2006.01)
*H04N 1/193* (2006.01)
*H04N 1/00* (2006.01)

(52) U.S. Cl.
CPC ........... *H04N 1/193* (2013.01); *H04N 1/00204* (2013.01)
USPC ............................ 358/498; 358/496; 358/468

(58) Field of Classification Search
USPC ........................... 358/474, 400, 401, 448, 468
See application file for complete search history.

(56) References Cited

U.S. PATENT DOCUMENTS

| | | | |
|---|---|---|---|
| 8,162,309 B2 * | 4/2012 | Kawamata et al. | 271/10.03 |
| 8,254,826 B2 * | 8/2012 | Uchino et al. | 399/401 |
| 2004/0201872 A1 * | 10/2004 | Horaguchi et al. | 358/500 |
| 2005/0156876 A1 * | 7/2005 | Kong | 345/156 |
| 2006/0072102 A1 * | 4/2006 | Jianping et al. | 356/28.5 |
| 2007/0177226 A1 * | 8/2007 | Ishida et al. | 358/474 |
| 2008/0134784 A1 * | 6/2008 | Jeng et al. | 73/514.01 |
| 2008/0180756 A1 * | 7/2008 | Nagasaka | 358/474 |
| 2009/0026685 A1 * | 1/2009 | Uchino et al. | 270/18 |

FOREIGN PATENT DOCUMENTS

| | | |
|---|---|---|
| JP | 64043434 A | 2/1989 |
| JP | 64064961 A | 3/1989 |
| JP | S64-40959 U | 3/1989 |
| JP | 05035354 A | 2/1993 |
| JP | 05035355 A | 2/1993 |
| JP | 05134904 A | 6/1993 |
| JP | H05-323063 A | 12/1993 |
| JP | S63-244966 A | 10/1998 |
| JP | 2008-090345 A | 4/2008 |

OTHER PUBLICATIONS

Office Action issued in corresponding Chinese patent Application No. 201010223380.7, dated Mar. 26, 2013.
Notice of Rejection issued in Japanese Application No. 2010-013619 dated Jun. 4, 2013.

* cited by examiner

*Primary Examiner* — Jerome Grant, II
(74) *Attorney, Agent, or Firm* — Lowe Hauptman & Ham, LLP

(57) ABSTRACT

An image reading apparatus includes: a conveyor roller configured to come in contact with a sheet-like medium and to convey the contacted medium in a conveyance direction in which the medium is conveyed; an image pickup device configured to pick up an image of the conveyed medium; a control device configured to control the conveyor roller and the image pickup device; an apparatus main unit that accommodates the conveyor roller, the image pickup device, and the control device; and a state detecting device configured to detect whether the apparatus main unit is in a stationary state in which the apparatus main unit is stationary or in a non-stationary state in which the apparatus main unit is not stationary, wherein the control device is configured to change contents of the control of at least the conveyor roller based on a result of the detection by the state detecting device.

6 Claims, 7 Drawing Sheets

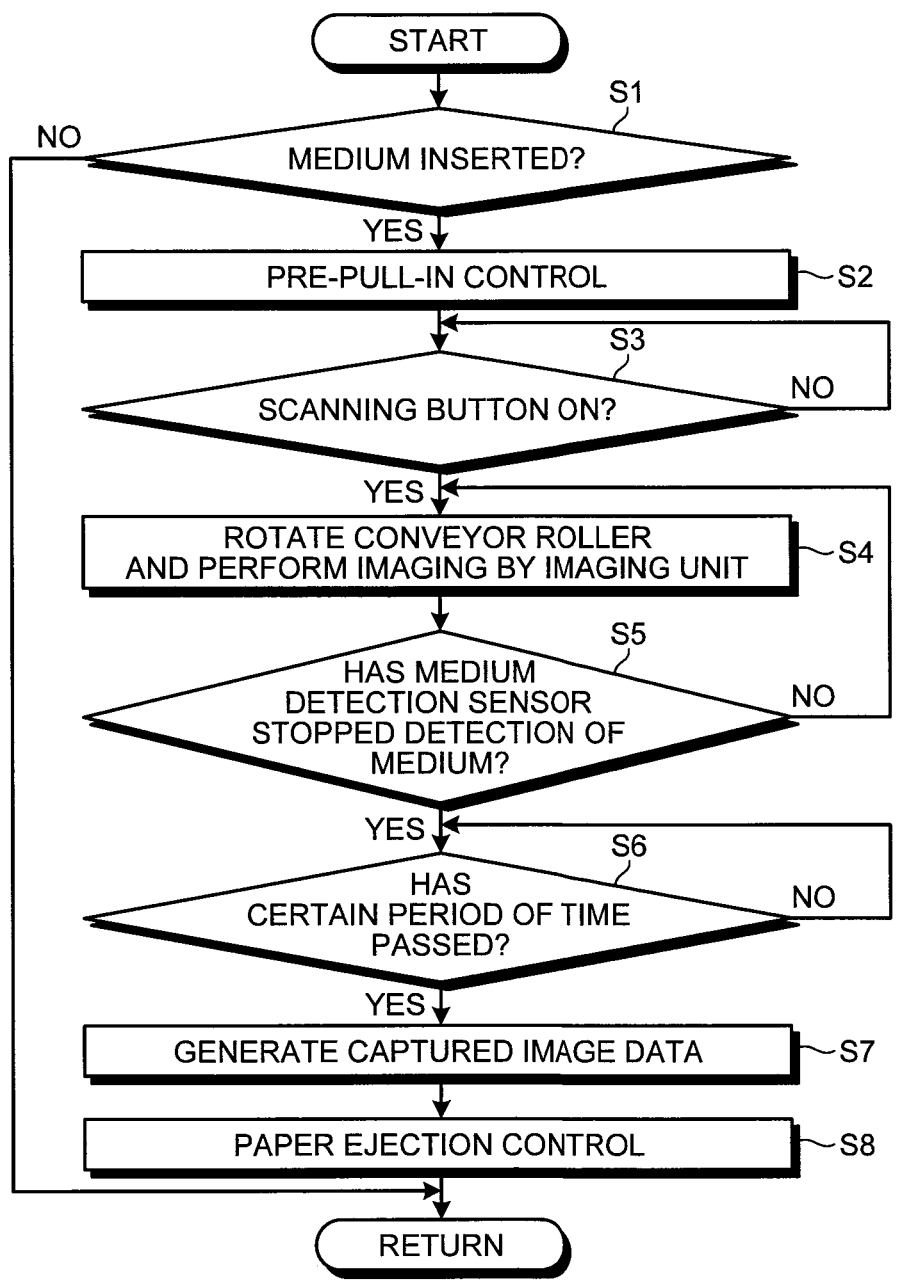

IMAGE READING APPARATUS

CROSS-REFERENCE TO RELATED APPLICATIONS

This application is based upon and claims the benefit of priority from Japanese Patent Application No. 2010-013619, filed Jan. 25, 2010, the entire contents of which are incorporated herein by reference.

BACKGROUND OF THE INVENTION

1. Field of the Invention

The present invention relates to an image reading apparatus that conveys a sheet-like medium and picks up an image of the medium being conveyed.

2. Description of the Related Art

Conventionally, there is an image reading apparatus that conveys a sheet-like medium and picks up an image of the medium being conveyed. In this image reading apparatus, once a sheet-like medium is inserted into an apparatus main unit, it is conveyed to an image pickup device by a conveyor roller, its image is picked up by the image pickup device, and ejected from the apparatus main unit by the conveyor roller.

As a technique related to conveyance of a sheet-like medium, there are inventions in which a sheet-like medium ejected from an apparatus main unit is held by a conveyor roller. This type of invention includes an image pickup device disclosed in Japanese Patent Application Laid-open No. S64-43434 and an image forming apparatus disclosed in Japanese Patent Application Laid-open No. S64-64961, for example.

In the image pickup device disclosed in Japanese Patent Application Laid-open No. S64-43434, a noncompliant sheet, which is determined to have a noncompliant size for re-feeding to an imaging unit including a photoconductor drum or the like by a control circuit, is ejected to outside of an apparatus from a vertical conveyor unit incorporated in a copier main unit by a conveyor roller. A conveyor roller pair near an ejection opening holds the noncompliant sheet ejected outside of the apparatus. That is, in the image pickup device in Japanese Patent Application Laid-open No. S64-43434, the noncompliant sheet is held by the conveyor roller pair near the ejection opening without having the sheet dropped outside of the apparatus, and an operator pulls the noncompliant sheet out from the conveyor roller pair near the ejection opening.

In the image forming apparatus disclosed in Japanese Patent Application Laid-open No. S64-64961, a drive motor is halted by a control unit, and a sheet ejected outside of a machine incorporating a copying unit or the like is sandwiched by an ejection roller pair. That is, in the image forming apparatus disclosed in Japanese Patent Application Laid-open No. S64-64961, the sheet ejected outside of the machine is held by the ejection roller pair without dropping it, and an operator pulls the sheet out from the ejection roller pair.

Among image reading apparatuses, there is a type of apparatus capable of capturing an image of a sheet-like medium while conveying the medium in a stationary state where the apparatus main unit is stationary, or in a non-stationary state where the main unit is not stationary.

For example, Japanese Patent Application Laid-open Nos. H5-35354, H5-35355, H5-134904, and 2008-90345 disclose techniques related to detection of a state of an apparatus main unit. Japanese Patent Application Laid-open Nos. H5-35354 and H5-35355 disclose a technique of detecting, by an inclination detector, an installation inclination change of a portable computer main unit when a state thereof has been shifted from a normal installation state to a held state (hereinafter, the portable computer main unit when the state thereof has been shifted from a normal installation state to a held state is simply referred to as "portable computer at the time of state shifting"), a technique of detecting an installation pressure change of the portable computer main unit at the time of state shifting by a pressure detector, and a technique of detecting a change in an installation distance of the portable computer main unit at the time of state shifting by using an ultrasonic signal or the like. Further, Japanese Patent Application Laid-open No. H5-134904 discloses a technique of recognizing (determining) whether a portable terminal device is in a still state or in a moving state by using an angular moment of inertia. Furthermore, Japanese Patent Application Laid-open No. 2008-90345 discloses a technique of determining whether a usage state of a portable computer is in an installation mode or in a portable mode, according to an output of an acceleration sensor or a signal of a mode detection switch.

In a non-stationary state of an apparatus main unit, when a user tries to pick up an image of a sheet-like medium by an image reading apparatus while holding the apparatus main unit with one hand, the user needs to insert the sheet-like medium with the other free hand and receive the imaged sheet-like medium by the other hand, which is used to insert the sheet-like medium into the apparatus main unit. In the non-stationary state of the apparatus main unit while holding the apparatus main unit with one hand, when the user inserts the sheet-like medium with the other free hand and cannot receive the imaged sheet-like medium by the other hand, the sheet-like medium ejected from the apparatus main unit drops and is damaged. That is, in the non-stationary state of the apparatus main unit, when a conveyor roller is controlled in the same manner as in the conveyor roller in a stationary state of the apparatus main unit, the usability of the image reading apparatus is degraded.

SUMMARY OF THE INVENTION

It is an object of the present invention to at least partially solve the problems in the conventional technology.

According to an aspect of the present invention, an image reading apparatus includes: a conveyor roller configured to come in contact with a sheet-like medium and to convey the contacted medium in a conveyance direction in which the medium is conveyed; an image pickup device configured to pick up an image of the conveyed medium; a control device configured to control the conveyor roller and the image pickup device; an apparatus main unit that accommodates the conveyor roller, the image pickup device, and the control device; and a state detecting device configured to detect whether the apparatus main unit is in a stationary state in which the apparatus main unit is stationary or in a non-stationary state in which the apparatus main unit is not stationary. This control device is configured to change contents of the control of at least the conveyor roller based on a result of the detection by the state detecting device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a flowchart of an outline of an operating procedure of the image reading apparatus;

DETAILED DESCRIPTION OF THE PREFERRED EMBODIMENTS

Exemplary embodiments of an image reading apparatus according to the present invention will be explained below in detail with reference to the accompanying drawings. The present invention is not limited to the embodiments.

Figure 1:
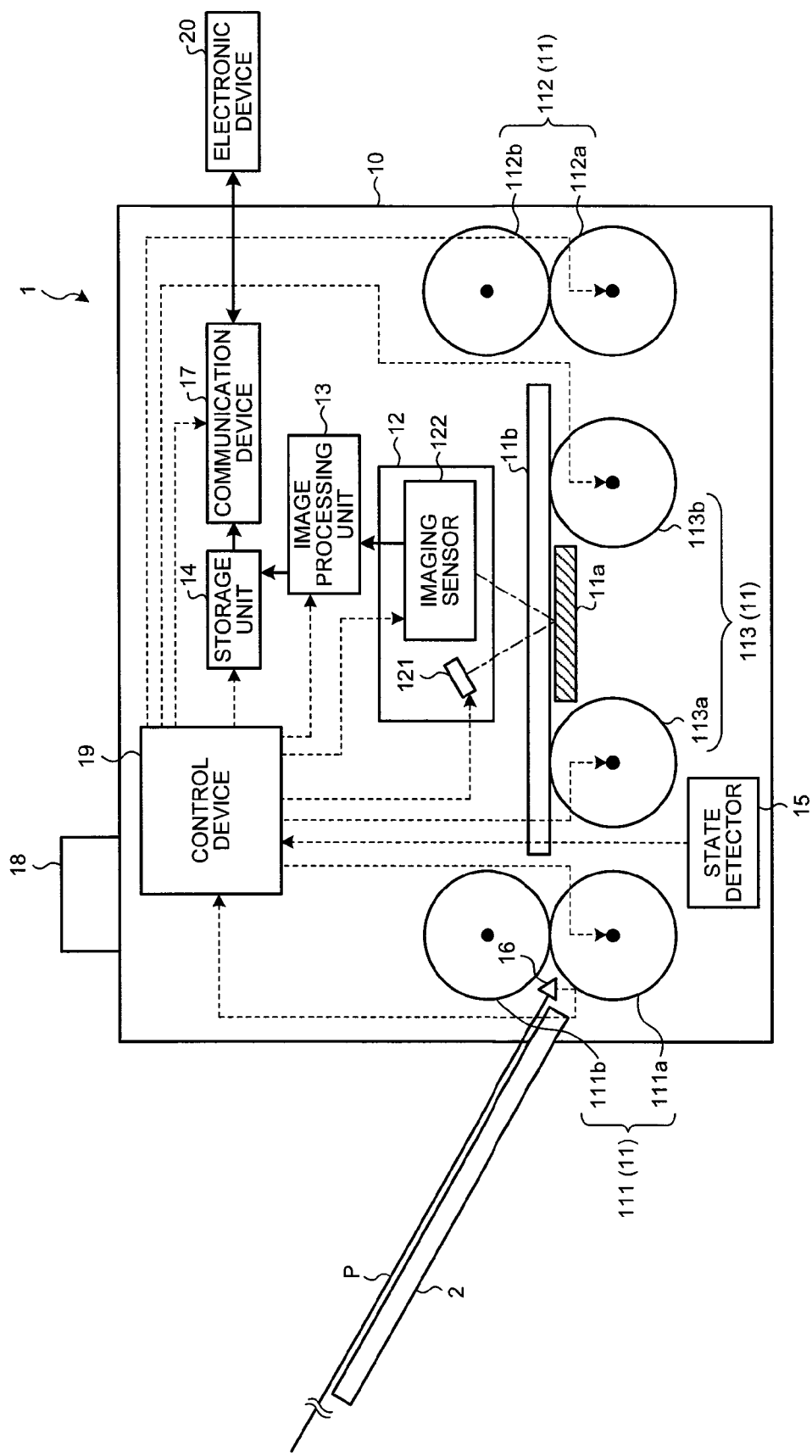
FIG. 1 is a side view of an outline of an image reading apparatus according to an embodiment of the present invention.

An image reading apparatus according to an embodiment of the present invention is explained below. FIG. 1 is a side view of an outline of the image reading apparatus according to this embodiment. An image reading apparatus 1 conveys a sheet-like medium P and images the medium P being conveyed. In the following explanations, the sheet-like medium P is simply referred to as "the medium P". The image reading apparatus 1 includes a housing 10, a conveyor roller 11, an image pickup unit 12, an image processing unit 13, a storage unit 14, a state detector 15, a medium detection sensor 16, a communication device 17, a scan button 18, and a control device 19.

The housing 10 is an apparatus main unit. The housing 10 accommodates constituent elements included in the image reading apparatus 1, such as the conveyor roller 11, the image pickup unit 12, the image processing unit 13, the storage unit 14, the state detector 15, the medium detection sensor 16, the communication device 17, and the control device 19.

The conveyor roller 11 conveys the medium P. In the present embodiment, the conveyor roller 11 includes a plurality of rollers, such as a pair of paper feed rollers 111, a pair of paper ejection rollers 112, and an imaging roller 113 including two rollers. In the present embodiment, the paper feed roller 111 is the conveyor roller arranged on the most upstream side in a conveyance direction, which is a direction in which the medium P is conveyed. In the present embodiment, the paper ejection roller 112 is the conveyor roller 11 arranged on the most downstream side in the conveyance direction. In the present embodiment, the imaging roller 113 is the conveyor roller 11 arranged between the paper feed roller 111 and the paper ejection roller 112 in the conveyance direction. That is, these conveyor rollers 11 are successively arranged in the conveyance direction. The respective conveyor rollers 11 are rotatably supported around a rotation axis thereof. In the present embodiment, a part of an outer circumference of each conveyor roller is arranged to overlap a conveyor path.

The paper feed roller 111 conveys the medium P inserted into the housing 10 to an imaging position of the medium P by the image pickup unit 12 via an imaging roller 113a and an image-read support plate 11b, which are described later. That is, the paper feed roller 111 is the conveyor roller 11 arranged on the upstream side of the image pickup unit 12 in the conveyance direction. The imaging position of the medium P by the image pickup unit 12 is hereinafter simply referred to as "the imaging position".

The paper feed roller 111 is a roller pair including a drive roller 111a and a driven roller 111b. In the present embodiment, the drive roller 111a is arranged with a rotation axis thereof being arranged below the conveyor path. On the other hand, the driven roller 111b is arranged with the rotation axis thereof being arranged above the conveyor path, so that it is able to contact the drive roller 111a. That is, the driven roller 111b faces the drive roller 111a with the conveyor path being sandwiched therebetween, and is arranged to be in contact with the drive roller 111a.

In the present embodiment, the drive roller 111a is connected to a drive system described later (not illustrated), and is rotatable by the drive system. In the present embodiment, the driven roller 111b is supported in such a manner that the driven roller 111b is pressed to a face of the medium P advancing between the drive roller 111a and the driven roller 111b. When the medium P is not positioned between the drive roller 111a and the driven roller 111b, the outer circumferential surface of the driven roller 111b comes in contact with the outer circumferential surface of the drive roller 111a. That is, the drive roller 111a comes in contact with the medium P advancing between the drive roller 111a and the driven roller 111b, and is rotated by the drive system to carry the contacted medium P.

The drive roller 111a is arranged successively with a paper feed tray 2 of the image reading apparatus 1 in the conveyance direction, and the outer circumferential surface thereof faces an end of the downstream side of the paper feed tray 2 in the conveyance direction. Therefore, when the drive roller 111a is rotated by the drive system and the medium P is guided toward the downstream side in the conveyance direction by the paper feed tray 2, a leading end of the medium P comes in contact with the outer circumferential surface of the drive roller 111a, and advances between the drive roller 111a and the driven roller 111b by rotation of the drive roller 111a. When the drive roller 111a is rotated by the drive system, the medium P inserted into the housing 10 via the paper feed tray 2 passes between the drive roller 111a and the driven roller 111b and then between the imaging roller 113a and the image-read support plate 11b, and the medium P is conveyed to the imaging position.

The paper ejection roller 112 ejects the medium P imaged by the image pickup unit 12 from the housing 10. That is, the paper ejection roller 112 is the conveyor roller 11 arranged on the downstream side of the image pickup unit 12 in the conveyance direction.

The paper ejection roller 112 is a roller pair including a drive roller 112a and a driven roller 112b. In the present embodiment, the rotation axis of the drive roller 112a is arranged below the conveyor path. On the other hand, the rotation axis of the driven roller 112b is arranged above the conveyor path. Because the relation between the drive roller 112a and the driven roller 112b is the same as that between the drive roller 111a and the driven roller 111b, explanations thereof will be omitted.

In the present embodiment, the drive roller 112a is connected to a drive system described later (not illustrated), and is rotatable by the drive system. When the drive roller 112a is rotated by the drive system and the medium P is guided to the downstream side in the conveyance direction by an imaging roller 113b and the image-read support plate 11b, which are described later, the leading end of the medium P comes in contact with at least the outer circumferential surface of the drive roller 112a, and the medium P advances between the drive roller 112a and the driven roller 112b by rotation of the drive roller 112a. That is, when the drive roller 112a is rotated by the drive system, the medium P having passed from the imaging position between the imaging roller 113b and the image-read support plate 11b, and advanced between the drive roller 112a and the driven roller 112b is ejected from the housing 10, that is, from the image reading apparatus 1 to outside by the rotation of the drive roller 112a.

The imaging roller 113 conveys the medium P in a state of facing the image pickup unit 12. The imaging roller 113 is the conveyor roller 11 including the imaging roller 113a and the imaging roller 113b. The imaging roller 113a is the upstream-side conveyor roller 11 of the imaging roller 113 in the conveyance direction, and the imaging roller 113b is the downstream-side conveyor roller 11 of the imaging roller 113 in the conveyance direction. The rotation axes of the imaging rollers 113a and 113b are arranged below the conveyor path.

A backing member 11a is arranged between the imaging rollers 113a and 113b. The backing member 11a faces the image pickup unit 12, with the image-read support plate 11b (described later) being sandwiched therebetween, and is arranged on an optical axis of light emitted from the image pickup unit 12. In the present embodiment, the backing member 11a is supported by the housing 10 of the image reading apparatus 1. The width of the backing member 11a in a main scanning direction is set to be wider than a width of the medium P having the widest width in the main scanning direction, of the media P that is scannable by the image reading apparatus 1. Therefore, a part of the backing member 11a is scanned together with the medium P when the medium P is scanned by the image pickup unit 12.

The imaging rollers 113a and 113b are arranged opposite to the image-read support plate 11b together with the backing member 11a. The image-read support plate 11b supports the medium P to be conveyed by the imaging roller 113. The image-read support plate 11b is a clear and colorless plate material. In the present embodiment, the image-read support plate 11b is arranged above the imaging roller 113a, the imaging roller 113b, and the backing member 11a.

In the present embodiment, the imaging rollers 113a and 113b are connected to the drive system described later (not illustrated), and is rotatable by the drive system. The imaging rollers 113a and 113b are biased in an opposite direction, which is a direction opposing the image-read support plate 11b, by a biasing unit (not illustrated) such as a coil spring, and are supported so that the imaging rollers 113a and 113b are pressed to the face of the medium P advancing between the opposed image-read support plate 11b and the imaging rollers. Therefore, when the medium P advances between the image-read support plate 11b and the opposed imaging roller 113 in a state where the imaging roller 113 is being rotated by the drive system, the image-read support plate 11b guides the advancing medium P to the downstream side in the conveyance direction by the imaging roller 113. That is, the imaging roller 113 comes in contact with the medium P advancing between the imaging roller and the image-read support plate 11b, and conveys the contacted medium P in the conveyance direction by being rotated by the drive system.

The drive roller 111a, the drive roller 112a, the imaging roller 113a, and the imaging roller 113b are rotated by the drive system (not illustrated). The drive system includes a drive motor and a driving-force transmission device, for example. The drive motor is a stepping motor, for example. The drive motor is driven when power is supplied from the control device 19, and is driven when a pulse signal is transmitted from the control device 19, for example. Accordingly, the drive motor is able to respectively rotate (in the clockwise direction in FIG. 1) the drive roller 111a, the drive roller 112a, the imaging roller 113a, and the imaging roller 113b via the driving-force transmission device.

In the present embodiment, an interval between the arranged conveyor rollers 11 adjacent to each other in the conveyance direction may be a distance such that the leading end of the medium P in the conveyance direction conveyed by the conveyor roller 11 on the upstream side in the conveyance direction, of the conveyor rollers 11 adjacent to each other, is able to infallibly reach the conveyor roller 11 on the downstream side in the conveyance direction, that is, a distance by which the medium P is infallibly transferrable between the conveyor rollers 11 adjacent to each other.

The conveyor roller 11 described above, that is, the paper feed roller 111, the paper ejection roller 112, and the imaging roller 113 are driven via the driving-force transmission device by power being supplied to the drive motor by the control device 19.

The image pickup unit 12 is an image pickup device. The image pickup unit 12 picks up an image of the medium P conveyed by the conveyor roller 11. In the present embodiment, the image pickup unit 12 is arranged between the imaging rollers 113a and 113b in the conveyance direction. In the present embodiment, one image pickup unit 12 is arranged on a side of the image-read support plate 11b opposite to a side where the drive rollers 111a and 112a and the imaging rollers 113a and 113b are arranged, that is, above the image-read support plate 11b to face the image-read support plate 11b. The image pickup unit 12 may be arranged above and below the conveyor path so that images on both sides of the medium P are able to be picked up.

The image pickup unit 12 includes a light source 121 and an imaging sensor 122.

In the present embodiment, the light source 121 is arranged near the imaging sensor 122 in the conveyance direction, for example, and is arranged on the upstream side of the imaging sensor 122. The light source 121 is a light-emitting diode (LED), for example, and scatters emitted light by a light guide plate (not illustrated) to emit light in a line shape in the main scanning direction toward the medium P being conveyed by the conveyor roller 11, and illuminates according to an illumination instruction from the control device 19.

The imaging sensor 122 includes a plurality of charge coupled device (CCD) imaging elements, for example. The imaging sensor 122 may include a plurality of complementary metal-oxide semiconductor (CMOS) imaging elements, for example. The imaging elements included in the imaging sensor 122 are arrayed in a line in the main scanning direction. In the imaging sensor 122, a width in the main scanning direction formed by the imaging elements is set longer than the width of the widest medium P in the main scanning direction, of the media P that are scannable by the image reading apparatus 1. The imaging sensor 122 is arranged on an optical axis of reflected light, which is light from the light source 121 reflected by the backing member 11a or the medium P conveyed by the conveyor roller 11, and scans a read area, which is an area including the entire area of the medium P therein, when the medium P is conveyed in the conveyance direction by the conveyor roller 11 in a state in which the light source 121 is illuminating. Accordingly, when the medium P is conveyed in the conveyance direction toward the imaging position by the conveyor roller 11, in other words, when scanning of the medium P is performed, because reflected light, which is light from the light source 121 reflected by the medium P or the backing member 11a, is incident on respective imaging elements of the imaging sensor 122, a captured image signal for each exposure corresponding to the read area is output from the respective imaging elements of the imaging sensor 122. The imaging sensor 122 generates and outputs line data for each main scanning direction from the captured image signal per exposure output from the respective imaging elements.

The imaging sensor 122 picks up the image of the medium P according to reflected light from the medium P conveyed toward the imaging position by the conveyor roller 11. The imaging sensor 122 picks up the image of the medium P according to an imaging instruction from the control device 19.

The image processing unit 13 generates picked-up image data corresponding to the image of the medium P picked up by the image pickup unit 12. The image processing unit 13 is connected to the imaging sensor 122, and inputs line data output from the imaging sensor 122 for each exposure by the light source 121. The image processing unit 13 collects a plurality of pieces of line data output from the imaging sensor 122, to generate picked-up image data, which is image data corresponding to the read area. That is, the image processing unit 13 collects the plurality of pieces of line data output from the imaging sensor 122 to generate the picked-up image data corresponding to the entire area of the medium P. The image processing unit 13 performs predetermined image processing on the captured image signal according to an image processing instruction from the control device 19.

The storage unit 14 stores the picked-up image data. The storage unit 14 is connected to the image processing unit 13, and stores the picked-up image data generated by the image processing unit 13 according to an instruction from the control device 19. The storage unit 14 is a memory such as a hard disk drive, a flash memory, or a silicon disk drive. The storage unit 14 may be a memory including a throttle of a memory card. That is, for example, the storage unit 14 may store the picked-up image data in a state where a commercially available memory card is inserted into the throttle. The storage unit 14 stores captured image according to a storage instruction from the control device 19.

The state detector 15 is a state detecting device. The state detector 15 detects whether the housing 10 is in a stationary state where the housing 10 is stationary or a non-stationary state where the housing 10 is not stationary. That is, the state detector 15 detects whether the image reading apparatus 1 is in the stationary state or in the non-stationary state. The state detector 15 outputs a detection result to the control device 19.

Figure 2A:
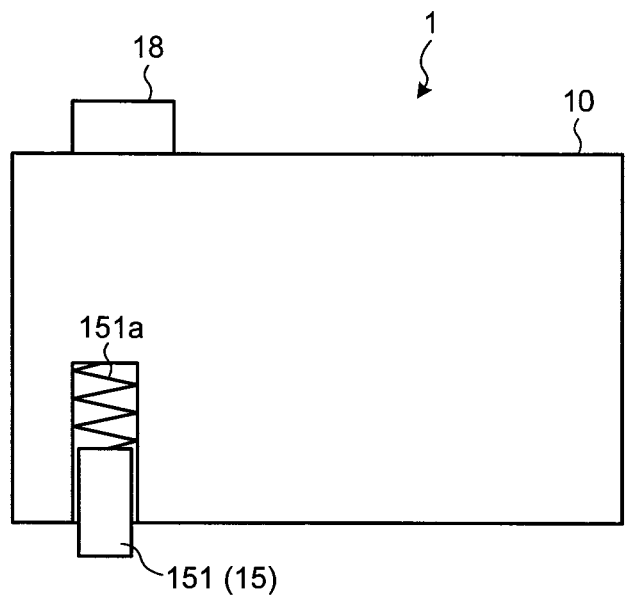
FIGS. 2A and 2B are schematic diagrams of an example of a state detector.
Figure 2B:
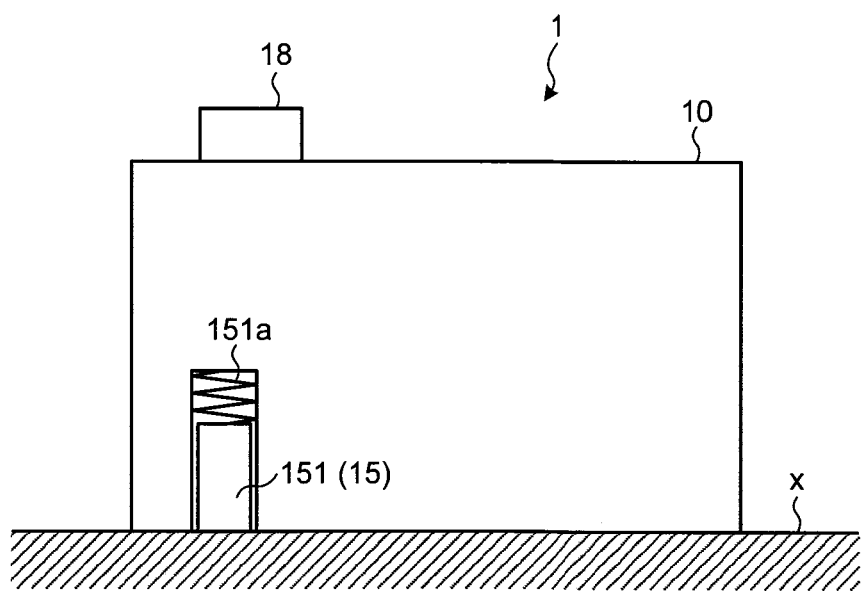

FIGS. 2A and 2B are schematic diagrams of an example of the state detector 15. As illustrated in FIGS. 2A and 2B, in the present embodiment, the state detector 15 is a switch 151 provided at the bottom of the housing 10. In the present embodiment, at least a part of the switch 151 is exposed to outside of the housing 10. In the present embodiment, the switch 151 is biased downward by a biasing member 151a provided in the image reading apparatus 1. As illustrated in FIG. 2A, when the housing 10 is in the non-stationary state, at least a distal end of the switch 151, which is a lower end, protrudes downward from the bottom of the housing 10 in a state where a proximal end, which is an upper end, is inserted into the bottom of the housing 10. As illustrated in FIG. 2B, when the housing 10 is in the stationary state, the switch 151 abuts on a mounting surface x, which is a surface on which the housing 10 is able to be stationary such as an upper surface of a top panel of a desk, to retract into the bottom of the housing 10 against a biasing force by the biasing member 151a. In the present embodiment, for example, a mechanical contact point (not illustrated) is provided at the proximal end of the switch 151. When protruding downward from the bottom of the housing 10, the switch 151 is in an OFF state, and when retracting into the bottom portion of the housing 10, the switch 151 is in an ON state. In FIGS. 2A and 2B, a coil spring is illustrated as the biasing member 151a. The switch 151 is different from the scan button 18.

Figure 3A:
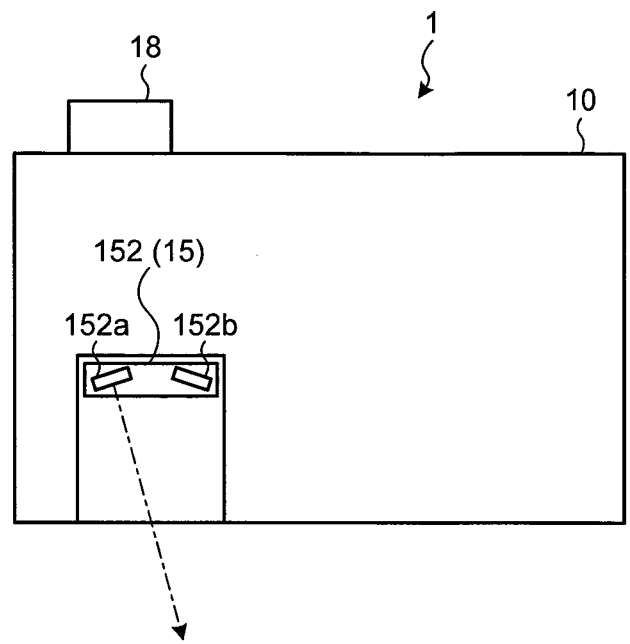
FIGS. 3A and 3B are schematic diagrams of another example of the state detector.
Figure 3B:
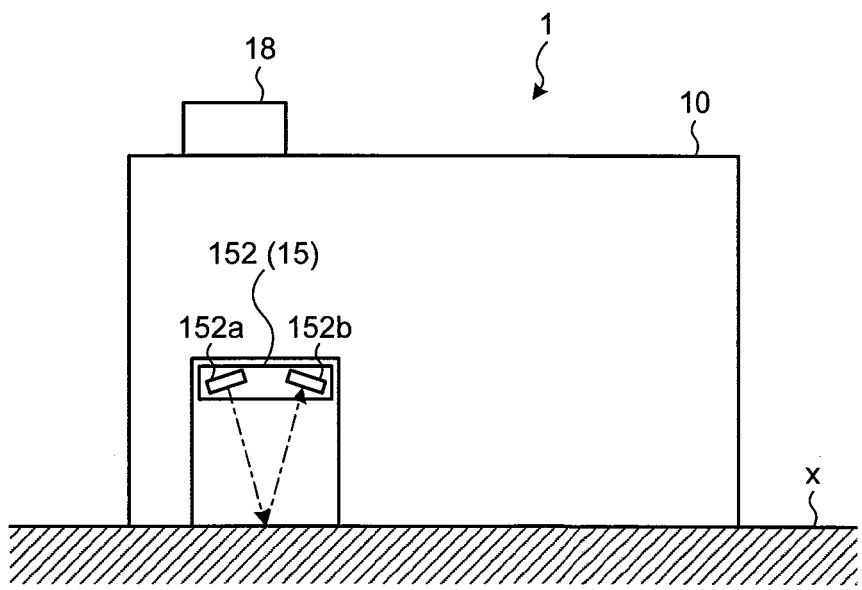

FIGS. 3A and 3B are schematic diagrams of another example of the state detector. As illustrated in FIGS. 3A and 3B, the state detector 15 may be an optical detecting unit 152 provided in the housing 10. In an example illustrated in FIGS. 3A and 3B, a part of the bottom of the housing 10 is open downward, and the optical detecting unit 152 is arranged in an opening. The optical detecting unit 152 includes a light emitting unit 152a and a light detecting unit 152b.

The light emitting unit 152a emits a state-detection outgoing beam, which is light for determining whether the housing 10 is in the stationary state or in the non-stationary state. As illustrated in FIG. 3A, the light emitting unit 152a emits the state-detection outgoing beam in a direction slightly inclined with respect to a normal direction, which is a direction vertical to the bottom of the housing 10 in response to an input signal from the control device 19. The light emitting unit 152a may be a light emitting device such as a light emitting diode or semiconductor laser. That is, the light emitting unit 152a may emit LED light or laser beams, for example.

The light detecting unit 152b detects state-detection reflected light, which is reflected light according to light emitted from the light emitting unit 152a. That is, the light detecting unit 152b detects light from the light emitting unit 152a reflected by the mounting surface x. For example, the light detecting unit 152b is a light receiving device such as a light receiving diode, and outputs different signals according to an amount of light received. As illustrated in FIG. 3B, the light detecting unit 152b is arranged on an optical axis of the state-detection reflected light in the stationary state of the housing 10 with respect to the mounting surface x. Therefore, when the housing 10 is in the stationary state with respect to the mounting surface x and the light emitting unit 152a emits light, light emitted from the optical detecting unit 152 is reflected by the mounting surface x, and the state-detection reflected light reaches the light detecting unit 152b, and thus the light detecting unit 152b is able to detect the state-detection reflected light. On the other hand, as illustrated in FIG. 3A, in the non-stationary state of the housing 10, when the light emitting unit 152a emits light, light emitted from the optical detecting unit 152 advances straight ahead without being reflected by the mounting surface x, and thus the state-detection reflected light does not reach the light detecting unit 152b, and the light detecting unit 152b is not able to detect the state-detection reflected light.

That is, the optical detecting unit 152 outputs different signals according to whether the state-detection reflected light is detected. In an example illustrated in FIGS. 3A and 3B, when the state-detection reflected light is detected, the optical detecting unit 152 is in an ON state, and when the state-detection reflected light is detected, the optical detecting unit 152 is in an OFF state.

The state detector 15 may instead be a piezoelectric element provided at the bottom of the housing 10, for example. When the state detector 15 is the piezoelectric element, the piezoelectric element is provided at the bottom of the housing 10. When the housing 10 is in the stationary state, the piezoelectric element is electrified by a pressure being applied from the housing 10 and the mounting surface x, and when the housing 10 is in the non-stationary state, the piezoelectric element is not electrified because pressure is not applied from outside. That is, in the case of the state detector 15 being the piezoelectric element, when the housing 10 is in the stationary state, the piezoelectric element is in an ON state, and when the housing 10 is in the non-stationary state, the piezoelectric element is in an OFF state.

The state detector 15 may be a distance measuring sensor that measures a distance between the image reading apparatus 1 and the mounting surface x. When the state detector 15 is the distance measuring sensor, the state detector 15 may be provided at the bottom of the housing 10 or may be provided on the lateral side of the housing 10. When the state detector 15 is the distance measuring sensor, the state detector 15 outputs a detection result to the control device 19. The control device 19 obtains a distance between the housing 10 and the mounting surface x, to determine whether the housing 10 is in the stationary state or in the non-stationary state.

As described above, various types of state detectors 15 may be applied to the image reading apparatus 1. The switch 151 is explained below as the state detector 15 as an example.

The medium detection sensor 16 detects the medium P in contact with at least one of the paper feed roller 111 and the paper ejection roller 112. In the present embodiment, the medium detection sensor 16 is arranged on the upstream side of and right next to the drive roller 111a in the conveyance direction. In the present embodiment, the medium detection sensor 16 includes a plurality of mechanical switches. In the present embodiment, the plurality of mechanical switches are successively arranged in a width direction, which is a direction orthogonal to the conveyance direction. In the present embodiment, proximal ends of the mechanical switches, which are lower ends, are connected with each other and integrated. In the present embodiment, the plurality of mechanical switches are biased upward by a biasing member (not illustrated) provided below the conveyor path. In the present embodiment, at least distal ends, which are upper ends of the respective mechanical switches protrude into the conveyor path in a state in which the medium P is not in contact. In the present embodiment, when a part, exposed in the conveyor path, of the mechanical switch that contacts the medium P is pressed by the self-weight of the medium P, the mechanical switch retracts downward with respect to the conveyor path against a biasing force by the biasing member together with the other mechanical switches. In the present embodiment, a mechanical contact point (not illustrated) is provided at the proximal ends of the plurality of mechanical switches. Therefore, in the present embodiment, the medium detection sensor 16 is in an OFF state when the plurality of mechanical switches protrude in the conveyor path, and when the plurality of mechanical switches retract downward with respect to the conveyor path, the medium detection sensor 16 is turned in an ON state. That is, the medium detection sensor 16 outputs medium detecting signals different from each other to the control device 19 according to whether the medium P in contact with the conveyor roller 11 has been detected.

The communication device 17 enables communication between the image reading apparatus 1 and an external electronic device 20. The communication device 17 is communication means including an interface such as an infrared port conforming to the infrared data association (IrDA) standard, a wireless local area network (LAN) port, a universal serial bus (USB) connector, or a Bluetooth transmitter receiver, and is connectable to the external electronic device 20 via wired or wireless communication. The communication device 17 is connected to the storage unit 14. For example, the communication device 17 is provided on the side of the housing 10 in a communicatable state with the electronic device 20 connected to the housing 10 via a communication control signal input and output between the control device 19 and the communication device 17.

The scan button 18 issues an instruction to start scanning of the medium P to the control device 19. For example, the scan button 18 is provided on a surface of the housing 10 excluding the bottom, and exposed to outside of the housing 10. In the present embodiment, the scan button 18 is provided on the top of the housing 10. The scan button 18 starts scanning of the medium P including conveyance of the medium P by the conveyor roller 11 and imaging of the medium P by the image pickup unit 12, by being pressed by a user. When being operated, the scan button 18 outputs a scanning start signal to the control device 19.

The control device 19 controls the conveyor roller 11, the image pickup unit 12, the image processing unit 13, the storage unit 14, and the communication device 17.

An operation of the image reading apparatus 1 according to the present embodiment is explained next.

The control device 19 changes contents of control at least for the conveyor roller 11 based on a detection result of the switch 151.

FIG. 4 is a flowchart of an outline of an operating procedure of the image reading apparatus. As illustrated in FIG. 4, when the power of the image reading apparatus 1 is turned on, the control device 19 first determines whether the medium P has been inserted in the housing 10 according to a medium detection signal output from the medium detection sensor 16, before the scan button 18 is pressed (Step S1). That is, the control device 19 determines whether the medium P is in a state where the medium P has been placed alone on the paper feed tray 2 by a user, in other words, a state where the medium P has been manually inserted alone by the user. When determining that the medium P has been inserted in the housing 10 (YES at Step S1), the control device 19 performs pre-pull-in control (Step S2). That is, when determining that the medium P has been inserted in the housing 10, the control device 19 supplies power to the drive motor to rotate the drive roller 111a, so that the leading end of the medium P inserted into the housing 10 in the conveyance direction is held by the drive roller 111a and the driven roller 111b. When determining that the medium P has not been inserted in the housing 10 (NO at Step S1), the control device 19 repeats the process at Step S1 until the medium P is inserted in the housing 10 (RETURN).

Figure 5:
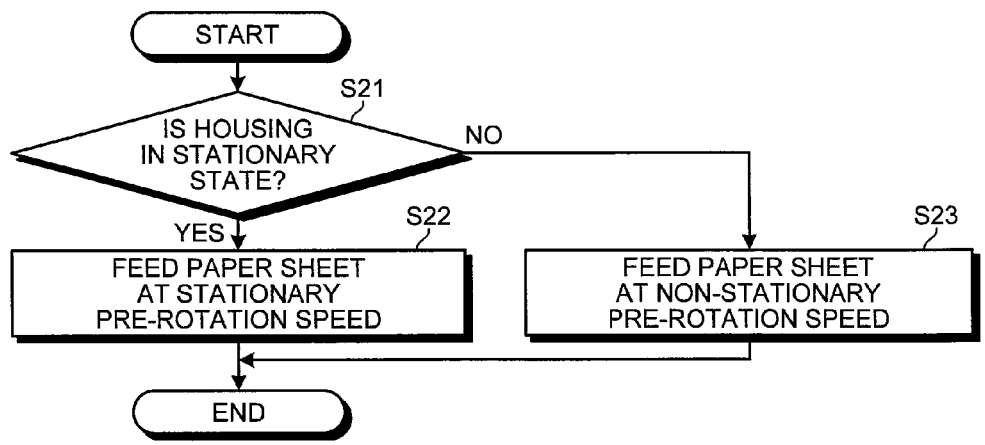
FIG. 5 is a flowchart of an operating procedure of pre-pull-in control.

The pre-pull-in control is explained below in detail. FIG. 5 is a flowchart of an operating procedure of the pre-pull-in control. That is, FIG. 5 depicts processing contents at Step S2 in FIG. 4 in detail.

The control device 19 determines whether the housing 10 is in the stationary state or in the non-stationary state, and changes over a pull-in speed, which is a speed of pulling the medium P into the housing 10 by the drive roller 111a and the driven roller 111b. As illustrated in FIG. 5, in the pre-pull-in control, the control device 19 first determines whether the housing 10 is in the stationary state or in the non-stationary state (Step 21). More specifically, in the present embodiment, the control device 19 determines whether the housing 10 is in the stationary state or in the non-stationary state by determining whether the switch 151 is in an ON state or in an OFF state. In the present embodiment, when determining that the switch 151 is in an ON state, the control device 19 determines that the housing 10 is in the stationary state, and when determining that the switch 151 is in an OFF state, the control device 19 determines that the housing 10 is in the non-stationary state.

When determining that the housing 10 is in the stationary state (YES at Step S21), the control device 19 feeds a paper sheet at a stationary pre-rotation speed (Step S22). The stationary pre-rotation speed is a rotation speed of the drive roller 111a in the pre-pull-in control in the stationary state of the housing 10. When determining that the switch 151 is in an ON state to determine that the housing 10 is in the stationary state, the control device 19 controls, for example, the number of pulses to be supplied to a drive unit and a duty ratio of the pulse to rotate the drive roller 111a at a relatively high rotation speed, so that the leading end of the medium P inserted into the housing 10 in the conveyance direction is held quickly by the drive roller 111a and the driven roller 111b, to finish the pre-pull-in control (END).

When determining that the housing 10 is in the non-stationary state (NO at Step S21), the control device 19 performs paper feeding at a non-stationary pre-rotation speed (Step S23). The non-stationary pre-rotation speed is a rotation speed of the drive roller 111a in the pre-pull-in control in the non-stationary state of the housing 10. The control device 19 makes the non-stationary pre-rotation speed smaller than the stationary pre-rotation speed. In the present embodiment, when determining that the switch 151 is in an OFF state to determine that the housing 10 is in the non-stationary state, the control device 19 controls, for example, the number of pulses to be supplied to the drive unit and the duty ratio of the pulse to rotate the drive roller 111a at a relatively low rotation speed, so that the leading end of the medium P inserted into the housing 10 in the conveyance direction is held slowly by the drive roller 111a and the driven roller 111b, to finish the pre-pull-in control (END).

As illustrated in FIG. 4, when the pre-pull-in control is finished (Step S2), the control device 19 determines whether the scan button 18 has been turned on by determining whether a scanning start signal from the scan button 18 has been input (Step S3). When determining that the scan button 18 has been turned on (YES at Step S3), the control device 19 rotates the conveyor roller 11 and the image pickup unit 12 picks up the image of the medium P (Step S4). More specifically, when determining that the scan button 18 has been turned on (YES at Step S3), the control device 19 supplies power to the drive motor to rotate the conveyor roller 11, outputs an illumination instruction to the light source 121 to illuminate the light source 121, and outputs an imaging instruction to the imaging sensor 122 to cause the imaging sensor 122 to pick up the image of the medium P. That is, the image of the medium P is picked up by the image pickup unit 12 while the medium P is being conveyed by the conveyor roller 11. That is, the control device 19 causes the imaging sensor 122 to generate plural pieces of line data corresponding to the read area and output the line data to the image processing unit 13. When determining that the scan button 18 has not been turned on by determining whether the scanning start signal from the scan button 18 has been input (NO at Step S3), the control device 19 repeats the process at Step S3 until the scan button 18 is turned on.

The control device 19 determines whether the medium detection sensor 16 has stopped detection of the medium P, based on the medium detection signal output from the medium detection sensor 16 (Step S5). While the medium detection sensor 16 is detecting the medium P (NO at Step S5), the control device 19 returns to Step S4 to continue conveyance of the medium P by the conveyor roller 11 and imaging of the medium P by the image pickup unit 12. When determining that the medium detection sensor 16 no longer detects the medium P (YES at Step S5), the control device 19 waits until a predetermined period of time has passed, from the time point at which the medium detection sensor 16 no longer detects the medium P (NO at Step S6) until the image pickup unit 12 has picked up the image of only the backing member 11a for at least one scan after imaging of the medium P by the image pickup unit 12 has finished. When the predetermined period of time has passed (YES at Step S6), the control device 19 generates picked-up image data based on the pieces of line data corresponding to the read area (Step S7). More specifically, the control device 19 collects the pieces of line data corresponding to the read area, thereby generating the picked-up image data corresponding to the entire area of the medium P. The control device 19 then performs paper ejection control of the medium P, upon generation of the picked-up image data (Step S8). More specifically, the control device 19 supplies power to the drive motor to rotate the drive roller 112a, thereby conveying the medium P in the conveyance direction and ejecting at least a part of the medium P from the housing 10.

Figure 6:
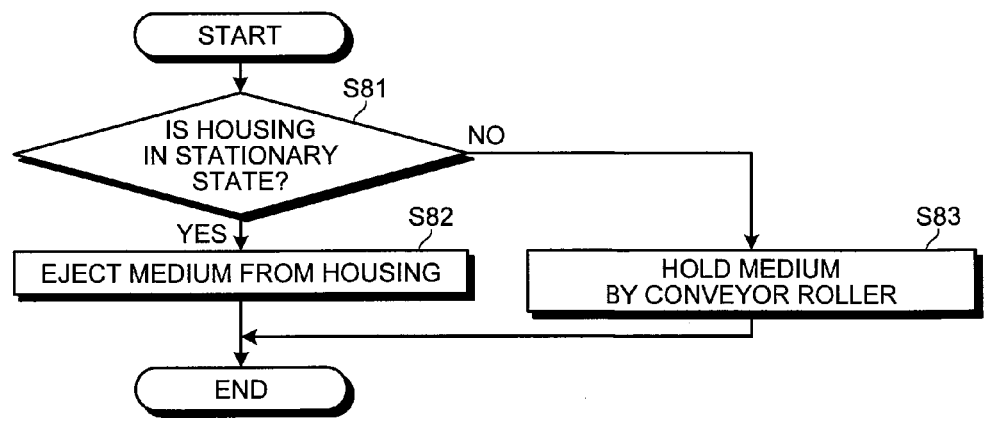
FIG. 6 is a flowchart of an operating procedure of paper ejection control.

The paper ejection control is explained below in detail. FIG. 6 is a flowchart of an operating procedure of the paper ejection control. That is, FIG. 6 depicts contents of processing at Step S8 in FIG. 4 in detail.

In the paper ejection control, the control device 19 determines whether the housing 10 is in the stationary state or in the non-stationary state, and changes the paper ejection control of the medium P according to a determination result thereof. As illustrated in FIG. 6, the control device 19 first determines whether the housing 10 is in the stationary state or in the non-stationary state (Step S81). When determining that the housing 10 is in the stationary state at Step S21, the control device 19 determines that the housing 10 is in the stationary state as well at Step S81, and when determining that the housing 10 is in the non-stationary state at Step S21, the control device 19 determines that the housing 10 is in the non-stationary state as well at Step S81.

When determining that the housing 10 is in the stationary state (YES at Step S81), the medium P is ejected from the housing 10 (Step S82), to finish the paper ejection control of the medium P (END). When determining that the housing is in the stationary state based on the detection result of the switch 151, the control device 19 causes the drive roller 112a and the driven roller 112b to eject the medium P from the housing 10. More specifically, in the present embodiment, when determining that a rear end of the medium P in the conveyance direction is detected based on a detection result of the medium detection sensor 16, the control device 19 controls, for example, the number of pulses to be supplied to the drive unit, thereby rotating the drive roller 112a by the number of rotations for paper ejection, which is the number of rotation in which ejecting the medium P in the stationary state of the housing 10 is possible. Accordingly, the control device 19 causes the drive roller 112a and the driven roller 112b to eject the medium P from the housing 10.

Figure 7:
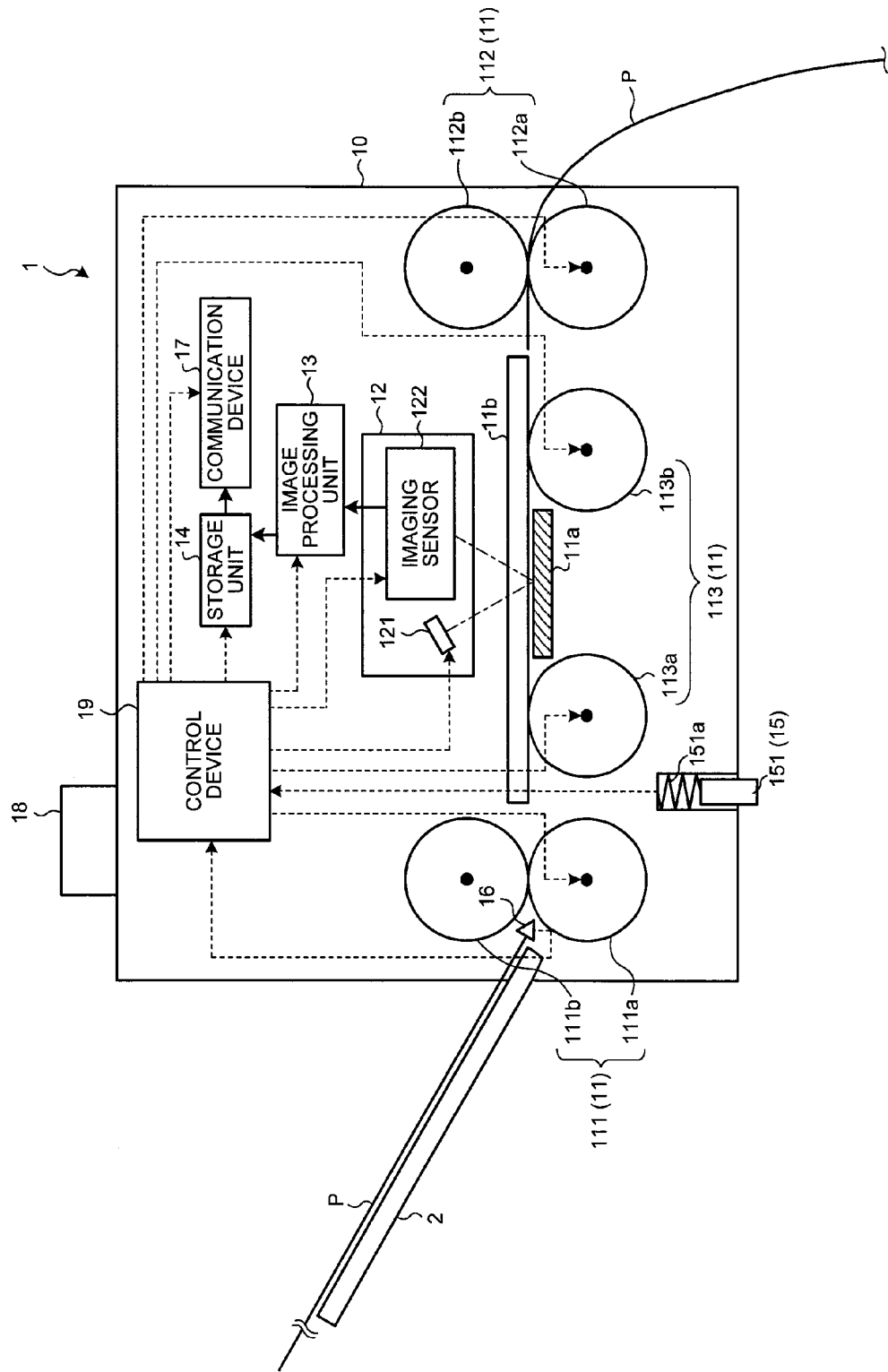
FIG. 7 is a side view of a state in which a medium imaged by an imaging unit is held by a paper ejection roller, in a non-stationary state of a housing.

On the other hand, in the present embodiment, when determining that the housing is in the non-stationary state (NO at Step S81), the control device 19 causes the conveyor roller to hold the medium P by the paper ejection roller 112 (Step S83), to finish the paper ejection control of the medium P (END). When determining that the housing is in the non-stationary state based on the detection result of the switch 151, the control device 19 causes the drive roller 112a and the driven roller 112b to hold the medium P. FIG. 7 is a side view of a state in which the medium P imaged by the image pickup unit 12 is held by the drive roller 112a and the driven roller 112b, in the non-stationary state of the housing 10. In the present embodiment, when determining that the rear end of the medium P in the conveyance direction is detected based on the detection result of the medium detection sensor 16, the control device 19 controls, for example, the number of pulses to be supplied to the drive unit, after the drive roller 112a and the driven roller 112b send the rear end of the medium P in the conveyance direction, thereby rotating the drive roller 112a by the number of rotation for holding, which is the number of rotation in which holding of the rear end of the medium P in the conveyance direction by the drive roller 112a together with the driven roller 112b becomes possible. Accordingly, the control device 19 causes the drive roller 112a and the driven roller 112b to hold the rear end of the medium P in the conveyance direction.

As illustrated in FIG. 4, the control device 19 performs the paper ejection control of the medium P (Step S8), and then determines whether the next medium P is placed on the paper feed tray 2 (RETURN).

As explained above, in the pre-pull-in control of the image reading apparatus 1, the control device 19 makes the non-stationary pre-rotation speed of the drive roller 111a smaller than the stationary pre-rotation speed thereof. Therefore, when the housing 10 is in the non-stationary state, the pull-in rate becomes slower than that in the non-stationary state of the housing 10. Accordingly, for example, when a user holds the housing 10 with one hand and inserts the medium P into the housing 10 with the other free hand, even when the medium P is inserted slantwise with respect to the conveyance direction, the user is able to correct the direction of the medium P easily in the conveyance direction with the other hand holding the medium P.

Further, in the paper ejection control of the image reading apparatus 1, when the image of the medium P is picked up by the image pickup unit 12 in the stationary state of the housing 10, the medium P conveyed to the image pickup unit 12 by the drive roller 111a and the driven roller 111b is ejected from the housing 10 by the drive roller 112a and the driven roller 112b, after being imaged by the image pickup unit 12. In the image reading apparatus 1, when the medium P is imaged by the image pickup unit 12 in the non-stationary state of the housing 10, the medium P conveyed to the image pickup unit 12 by the drive roller 111a and the driven roller 111b is held by the drive roller 112a and the driven roller 112b, after being imaged by the image pickup unit 12. That is, in the image reading apparatus 1, at least the contents of the control related to feeding and ejecting of the medium P is changed according to whether the housing 10 is in the stationary state or in the non-stationary state, based on the detection result of the switch 151. Accordingly, in the image reading apparatus, for example, when the housing 10 is in the non-stationary state, the drive roller 112a and the driven roller 112b prevent the imaged medium P from being ejected and dropped from the housing 10 and being damaged.

Figure 8:
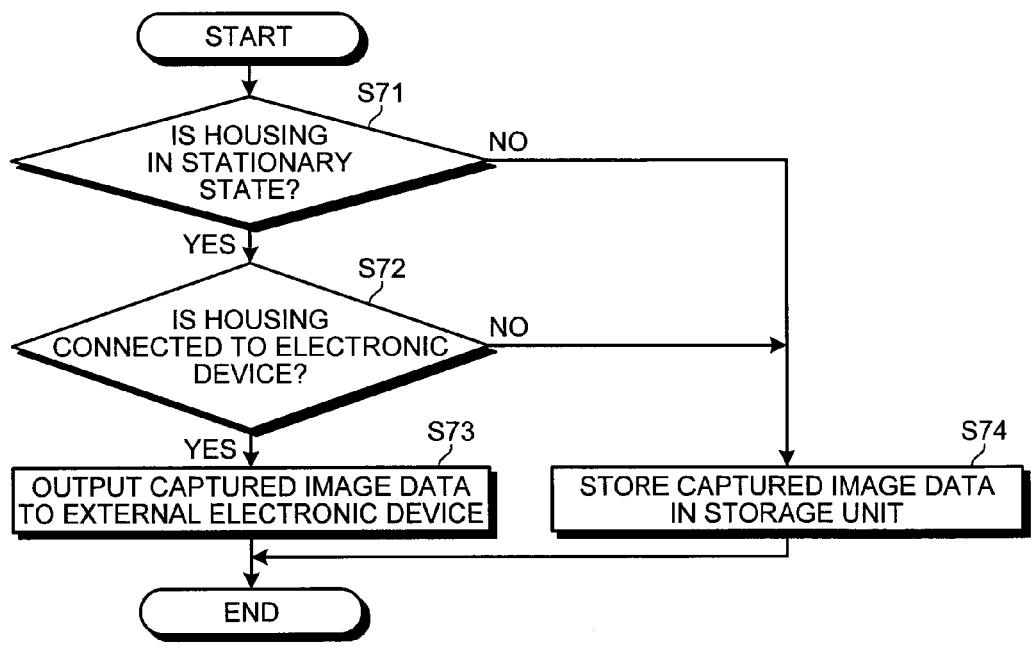
FIG. 8 is a flowchart of an operating procedure of control at the time of scanning.

The control at the time of scanning is explained below. FIG. 8 is a flowchart of an operating procedure of the control at the time of scanning. More specifically, FIG. 8 depicts contents of processing related to handling of the picked-up image data generated at Step S7 in FIG. 4 in detail.

In the control at the time of scanning, after having scanned the medium P, the control device 19 determines whether the housing 10 is in the stationary state or in the non-stationary state, and changes handling of the picked-up image data based on a determination result thereof. As illustrated in FIG. 8, the control device 19 determines whether the housing 10 is in the stationary state or in the non-stationary state at the time of selecting handling of the picked-up image data (Step S71). When determining that the housing 10 is in the stationary state at Step S21, the control device 19 determines that the housing 10 is in the stationary state as well at Step S71, and when determining that the housing 10 is in the non-stationary state at Step S21, the control device 19 determines that the housing 10 is in the non-stationary state as well at Step S71.

After scanning the medium P, when the control device 19 determines that the housing 10 is in the stationary state (YES at Step S71), the control device 19 determines whether the housing 10 is connected to the electronic device 20 (Step S72). That is, the control device 19 determines whether the housing 10 and the electronic device 20 are in a communicable state and whether a communication control signal is input and output between the communication device 17 and the control device 19.

When determining that the housing 10 is connected to the electronic device 20 (YES at Step S72), the control device 19 outputs the picked-up image data to the external electronic device 20 (Step S73). More specifically, because the control device 19 has determined that the housing is in the stationary state, when the communication device 17 and the external electronic device 20 are communicatable with each other by the communication control signal input and output between the communication device 17 and the control device 19, the control device 19 outputs the picked-up image data to the electronic device 20 by the communication device 17. That is, when the communication device 17 and the external electronic device 20 are connected with each other, the control device 19 causes the communication device 17 to transfer the picked-up image data to the electronic device 20, to finish the control at the time of scanning (END).

On the other hand, when determining that the housing 10 is in the non-stationary state (NO at Step S71) or when determining that the housing 10 is not connected to the electronic device 20 (NO at Step S72), the control device 19 causes the storage unit 14 to store the picked-up image data (Step S74). When determining that the housing 10 is in the non-stationary state or when determining that the communication control signal is not input and output between the communication device 17 and the control device 19 based on the detection result of the switch 151, the control device 19 causes the storage unit 14 to store the picked-up image data generated by the image processing unit 13. More specifically, when the housing 10 is in the non-stationary state, because the communication device 17 may not be connected to the external electronic device 20, when determining that the housing 10 is in the non-stationary state or when the communication device 17 and the external electronic device 20 are not connected with each other, the control device 19 causes the storage unit 14 to store the picked-up image data generated by the image processing unit 13. That is, to handle a situation where the communication device 17 and the external electronic device 20 are not connected with each other, the control device 19 outputs a storage instruction to the storage unit 14 to cause the storage unit 14 to store the picked-up image data generated by the image processing unit 13, to finish the control at the time of scanning (END).

As described above, in the control at the time of scanning in the image reading apparatus 1, when the housing 10 is in the non-stationary state, because the control device 19 causes the storage unit 14 to store the picked-up image data, for example, a user does not need to carry a device such as a notebook-sized personal computer having a memory for storing the picked-up image data, when the user carries and uses the image reading apparatus 1. That is, when the user carries and uses the image reading apparatus 1, the user is able to store the picked-up image data with the mere image reading apparatus 1. Accordingly, it is possible to improve convenience at the time of carrying and using the image reading apparatus 1.

In the image reading apparatus 1, if the control device 19 is not communicatable with the electronic device 20 via the communication device 17, when determining that the housing 10 is in the non-stationary state, the control device 19 causes the storage unit 14 to store the picked-up image data generated by the image processing unit 13. However, when the control device 19 becomes communicable with the electronic device 20 via the communication device 17 after determining that the housing 10 has changed from the non-stationary state to the stationary state, the control device 19 may cause the communication device 17 to output the picked-up image data stored in the storage unit 14 to the electronic device 20. In this case, when a user carries and uses the image reading apparatus 1 in a state where the communication device 17 is not communicatable with the external electronic device 20, the user temporarily stores the picked-up image data in the storage unit 14, and thereafter, when the user no longer carries the image reading apparatus 1, the user sets the housing 10 in the stationary state and connects the communication device 17 to the electronic device 20 to enable communication therebetween, thereby causing the picked-up image data stored in the storage unit 14 to be output to the external electronic device 20. That is, the image reading apparatus 1 in this case is able to make the change in the contents of the control by the control device 19 follow the mode of use by the user and to further improve the convenience upon carrying and using the image reading apparatus 1.

While the image reading apparatus 1 according to an exemplary embodiment of the present invention has been explained above, if it is certain that the image reading apparatus 1 is used in the non-stationary state, when the control device 19 determines that the switch 151 is changed from an OFF state to an ON state once by operating the switch 151 in the non-stationary state of the housing 10, and thereafter the switch 151 is in an OFF state again, the image reading apparatus 1 may start scanning of the medium P. The "if it is certain that the image reading apparatus 1 is used in the non-stationary state" means, for example, "if it has been set by the electronic device 20 communicatable with the image reading apparatus 1 that the control device 19 performs only the control in the non-stationary state", "if a non-stationary mode is selected by an operation of a switch that selects any one of three types of modes, which are, the control in the stationary state (a stationary mode), the control in the non-stationary state (the non-stationary mode), and the control of switching between the stationary mode and the non-stationary mode based on the detection result of the switch 151 (an automatic switching mode)", or "if it has been determined continuously for a predetermined time period or longer by the control device 19 that the housing 10 is in the non-stationary state". In the case of starting the scanning of the medium P in this manner, when the switch 151 is provided around a holding position of the housing 10, for example, a user is able to hold the housing 10 with one hand, and operate the switch 151 by the fingertips of the hand in this state. Accordingly, it is possible to improve the operability of the image reading apparatus 1 when the housing 10 is in the non-stationary state.

In the image reading apparatus 1, whether to perform the change in the contents of the control by the control device 19 based on the detection result of the switch 151 may be made settable by the external electronic device 20 via the communication device 17. Specifically, in a state where the communication device 17 is connected to the electronic device 20 such as a portable phone and is communicatable, the user operates the electronic device 20 to input an instruction signal to the control device 19, which instructs the control device 19 whether to validate or invalidate the change of the contents of the control by the control device 19 based on the detection result of the switch 151, via the communication device 17. The control device 19 then selects whether to validate or invalidate the change of the contents of the control by the control device 19 based on the detection result of the switch 151, in response to the input instruction signal. That is, the user operates the electronic device 20, for example, before carrying and using the image reading apparatus 1, in a state where the communication device 17 is connected to the external electronic device 20 and is communicatable, so that the user is able select whether to validate or invalidate the change of the contents of the control by the control device 19 based on the detection result of the switch 151. Accordingly, it is possible to determine beforehand, according to the intension of the user, whether to change the contents of the control by the control device 19 based on the detection result of the switch 151.

According to an embodiment of the present invention, it is possible to perform at least control of a conveyor roller depending on its use environment. The control is adapted to a difference between two use environments, which are a stationary state and a non-stationary state of an apparatus main unit. Accordingly, it is possible to improve usability of an image reading apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus, comprising:
a conveyor roller configured to come in contact with a sheet-like medium and to convey the contacted medium in a conveyance direction in which the medium is conveyed;
an image pickup device configured to pick up an image of the conveyed medium;
a control device configured to control the conveyor roller and the image pickup device;
an apparatus main unit that accommodates the conveyor roller, the image pickup device, and the control device; and
a state detecting device configured to detect whether the apparatus main unit is in a first state in which the apparatus main unit is stationary or in a second state in which the apparatus main unit is non-stationary, wherein
the control device is configured to change contents of the control of at least the conveyor roller based on a result of the detection by the state detecting device,
the control device is configured to cause the conveyor roller to rotate before starting the picking up of an image of the conveyed medium by the image pickup device to perform pre-pull-in control of causing the conveyor roller to hold a leading end in the conveyance direction of the medium inserted into the apparatus main unit, and
the control device is configured to make a handheld pre-rotation speed that is a rotation speed of the conveyor roller in the pre-pull-in control in the second state of the apparatus main unit smaller than a desktop pre-rotation speed that is a rotation speed of the conveyor roller in the pre-pull-in control in the first state of the apparatus main unit.

2. The image reading apparatus according to claim 1, wherein
the conveyor roller comprises a plurality of rollers arranged successively in the conveyance direction,
the plurality of rollers comprises:
a paper feed roller arranged upstream of the image pickup device in the conveyance direction and configured to convey the medium inserted into the apparatus main unit; and a paper ejection roller arranged downstream of the image pickup device in the conveyance direction and configured to eject the image-picked-up medium from the apparatus main unit, the control device is configured to cause the paper ejection roller to eject the image-picked-up medium from the apparatus main unit when the control device determines that the apparatus main unit is in the first state based on the result of the detection by the state detecting device, and the control device is configured to cause the paper ejection roller to hold the image-picked-up medium when the control device determines that the apparatus main unit is in the second state based on the result of the detection of the state detecting device.

3. The image reading apparatus according to claim 1, further comprising:

an image processing unit configured to generate picked-up image data corresponding to the image of the conveyed medium picked up by the image pickup device; and a storage unit configured to store the picked-up image data, wherein the control device is configured to control the image processing unit and the storage unit, and the control device is configured to cause the generated picked-up image data to be stored in the storage unit when the control device determines that the apparatus main unit is in the second state based on the result of the detection by the state detecting device.

4. The image reading apparatus according to claim 1, further comprising a communication device configured to be communicable with an external electronic device, wherein the control device is settable by the electronic device via the communication device as to whether to perform the change in the contents of the control based on the result of the detection by the state detecting device.

5. The image reading apparatus according to claim 1, further comprising a scan button for instructing the control device to start scanning of the medium, wherein the state detecting device is a switch provided at a bottom of the apparatus main unit, at least a part of the switch is configured to be exposed to outside with respect to the apparatus main unit, and the control device is configured to start the scanning upon operation of the switch when the control device determines that it is certain that the apparatus main unit is in the second state.

6. An image reading apparatus, comprising:

a conveyor roller configured to come in contact with a sheet-like medium and to convey the contacted medium in a conveyance direction in which the medium is conveyed;

an image pickup device configured to pick up an image of the conveyed medium;

a control device configured to control the conveyor roller and the image pickup device;

an apparatus main unit that accommodates the conveyor roller, the image pickup device, and the control device;

a state detecting device configured to detect whether the apparatus main unit is in a first state in which the apparatus main unit is stationary or in a second state in which the apparatus main unit is non-stationary, wherein the control device is configured to change contents of the control of at least the conveyor roller based on a result of the detection by the state detecting device;

an image processing unit configured to generate picked-up image data corresponding to the image of the conveyed medium picked up by the image pickup device;

a storage unit configured to store the picked-up image data, wherein the control device is configured to control the image processing unit and the storage unit, and the control device is configured to cause the generated picked-up image data to be stored in the storage unit when the control device determines that the apparatus main unit is in the second state based on the result of the detection by the state detecting device; and a communication device configured to be communicable with an external electronic device, wherein if the communication device is not communicable with the external electronic device, the control device causes the generated picked-up image data to be stored in the storage unit when the control device determines that the apparatus main unit is in the second state, and if the communication device becomes communicable with the external electronic device after the control device determines that the apparatus main unit has changed from the second state to the first state, the control device causes the communication device to output the stored picked-up image data to the electronic device.

\* \* \* \* \*